United States Patent [19]
Park et al.

[11] Patent Number: 5,448,367
[45] Date of Patent: Sep. 5, 1995

[54] APPARATUS FOR AUTOMATICALLY CONTROLLING GENERATION OF A HEAD SWITCHING SIGNAL

[75] Inventors: Sang D. Park; Bok H. Pack, both of Kyungki, Rep. of Korea

[73] Assignee: Goldstar Co., Ltd., Seoul, Rep. of Korea

[21] Appl. No.: 84,587

[22] Filed: Jul. 1, 1993

[30] Foreign Application Priority Data

Jul. 2, 1992 [KR] Rep. of Korea ............... 11767/1992
Oct. 16, 1992 [KR] Rep. of Korea ............... 19995/1992

[51] Int. Cl.⁶ .................. H04N 9/89; H04N 5/782
[52] U.S. Cl. ................... 358/323; 358/320; 358/321; 358/327; 360/70; 360/77.17
[58] Field of Search ............ 358/310, 320, 321, 323, 358/327, 314, 340; 360/77.12, 77.17, 70, 73.01, 77.01, 33.1; H04N 5/782, 9/89

[56] References Cited

U.S. PATENT DOCUMENTS

| | | | |
|---|---|---|---|
| 4,370,685 | 1/1983 | Hosoi et al. | 360/77.17 |
| 4,420,778 | 12/1983 | Sakamoto | 360/77.17 |
| 4,882,634 | 11/1989 | Satoh et al. | 360/77.12 |
| 5,175,630 | 12/1992 | Tabuchi et al. | 358/310 |

*Primary Examiner*—Howard W. Britton
*Assistant Examiner*—Huy Nguyen

[57] ABSTRACT

An apparatus and a method for automatically controlling pulse generation. The apparatus comprises a drum having video heads, a pulse generating head and a frequency generation head, first and second wave-shapers for wave-shaping a pulse generation signal from the pulse generating head and a frequency generation signal from the frequency generating head, respectively. There is also provided a mono-multi signal generator outputting a mono-multi signal having a rising curve time, a servo device for outputting a head switching signal in response to the mono-multi signal and outputting a drum control signal in response to the pulse and frequency generation signals and the head switching signal to control the speed and phase of the drum. There is further provided a luminance/chrominance processing circuit for selecting a channel for inputting one of video signals played back by the video heads in response to the head switching signal, for processing luminance and chrominance of the video signal from the selected channel and for outputting the processed video signal, and an automatic mono-multi signal control circuit for separating a vertical synchronous signal from the video signal, varying the rising curve time of the mono-multi signal in accordance with a time interval between the separated vertical synchronous signal and the head switching signal for thereby correcting an error of the head switching signal based on the rising curve time of the mono-multi signal.

3 Claims, 6 Drawing Sheets

FIG. 1
PRIOR ART
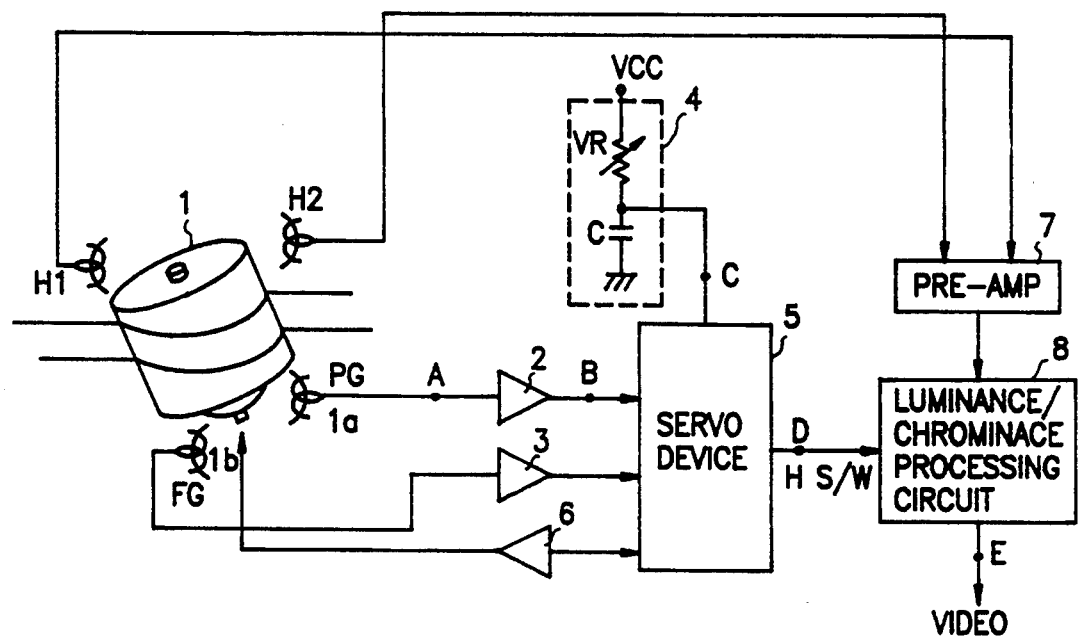
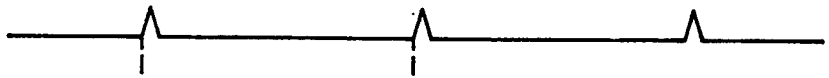
FIG. 2A
PRIOR ART
FIG. 2B
PRIOR ART
FIG. 2C
PRIOR ART
FIG. 2D
PRIOR ART
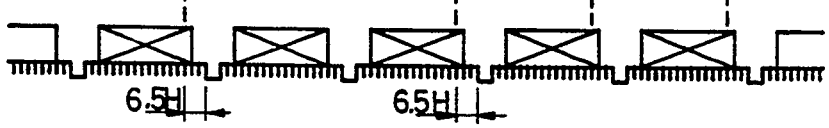
FIG. 2E
PRIOR ART

APPARATUS FOR AUTOMATICALLY CONTROLLING GENERATION OF A HEAD SWITCHING SIGNAL

BACKGROUND OF THE INVENTION

1. Field of the Invention

The present invention relates in general to video recording/playback systems, and an apparatus and a method for automatically controlling pulse generation, in which an error of a head switching signal resulting from a positioning error of a pulse generating head in a drum is accurately corrected.

2. Description of the Prior Art

Referring to FIG. 1, there is shown a conventional pulse generation control apparatus in a block form. As shown in this drawing, the conventional pulse generation control apparatus comprises a drum 1 with a pair of video heads H1 and H2, a pulse generating head 1a and a frequency generating head 1b. The video heads H1 and H2 are adapted to play back video signals recorded on a magnetic tape. The pulse and frequency generating heads 1a and 1b are adapted to generate a pulse generation signal PG and a frequency generation signal FG, respectively, to accurately play back the recorded video signals.

The conventional pulse generation control apparatus also comprises wave-shapers 2 and 3 for wave-shaping the pulse generation signal PG from the pulse generating head 1a and the frequency generation signal FG from the frequency generating head 1b, respectively, and a mono-multi signal generating circuit 4 for generating a mono-multi signal MM with its rising curve time t varied based on a time constant of a variable resistor VR and a condenser C.

A servo device 5 is provided to input the wave-shaped pulse generation signal and frequency generation signal from the wave-shapers 2 and 3 and the mono-multi signal MM from the mono-multi signal generating circuit 4, to output a head switching signal H S/W in response to the inputted mono-multi signal and to output through an amplifier 6 a drum control signal in response to the inputted pulse generation signal and frequency generation signal and the head switching signal H S/W, to control the speed and phase of the drum 1.

The conventional pulse generation control apparatus also comprises a pre-amplifying circuit 7 for amplifying the video signals played back by the video heads H1 and H2, and a luminance/chrominance processing circuit 8 for selecting a channel for inputting one of the video signals from the pre-amplifying circuit 7 in response to the head switching signal H S/W from the servo device 5, processing luminance and chrominance of the video signal input from the selected channel and outputting the processed video signal.

The operation of the conventional pulse generation control apparatus will hereinafter be described with reference to FIGS. 2A to 2E.

As the drum 1 is rotated, the video heads H1 and H2 play back the video signals recorded on the magnetic tape and the pulse generating head 1a and the frequency generating head 1b generate the pulse generation signal PG and the frequency generation signal FG, respectively. Namely, the pulse generation signal PG is outputted from the pulse generating head 1a, as shown in FIG. 2A, and then wave-shaped as shown in FIG. 2B by the wave-shaper 2. Also, the frequency generation signal FG is outputted from the frequency generating head 1b and then wave-shaped by the wave-shaper 3.

The wave-shaped pulse generation signal PG and frequency generation signal FG from the wave-shapers 2 and 3 are applied to the servo device 5, which also inputs the mono-multi signal MM from the mono-multi signal generating circuit 4, the rising curve time t of which is varied based on the time constant of the variable resistor VR and the condenser C.

A voltage level V of the mono-multi signal MM as shown in FIG. 2C can be expressed by the following equation:

$$V = 1 - e^{-(1/RC)t}$$

The rising curve time t of the mono-multi signal MM is varied according to a variation of the variable resistor VR.

The head switching signal H S/W is outputted from the servo device 5, as shown in FIG. 2D, to control the rotational phase of the drum 1. This head switching signal H S/W from the servo device 5 becomes high at a falling edge of the mono-multi signal MM from the mono-multi signal generating circuit 4 and goes low at 30 Hz in the case of a NTSC system and 25 Hz in the case of a PAL system.

The video signals played back by the video heads H1 and H2 are amplified by the pre-amplifying circuit 7 and then applied to the luminance/chrominance processing circuit 8. The luminance/chrominance processing circuit 8 serves to select a channel for inputting one of the video signals from the pre-amplifying circuit 7 in response to the head switching signal H S/W from the servo device 5. Also, as shown in FIG. 2E, the luminance/chrominance processing circuit 8 processes the luminance and chrominance of the video signal input from the selected channel and outputs the processed video signal field scan signals (whose envelopes are indicated by rectangles containing an "X") separated by vertical blanking intervals, each of which contain the vertical synchronization signal, Vs.

The control of the phase of the drum 1 is performed by adjusting an interval between a rising edge of the head switching signal H S/W as shown in FIG. 2D and the next subsequent edge of the vertical synchronous signal Vs of the video signal to 6.5 H (where H is the time interval between horizontal synchronization pulses in a television signal) as shown in FIG. 2E. The interval between the rising edge of the head switching signal H S/W and the next subsequent edge of the vertical synchronous signal Vs of the video signal is determined by adjusting the rising curve time t of the mono-multi signal MM, which is determined by adjusting the variable resistor VR in the mono-multi signal generating circuit 4.

Errors in the rotational speed and phase of the drum 1 are corrected by the adjustment of the head switching signal H S/W. The servo device 5 outputs the drum control signal to correct the errors. The drum control signal from the servo device 5 is amplified by the amplifier 6 and then applied to the drum 1, thereby causing the speed and phase of the drum 1 to be controlled.

However, the above-mentioned conventional pulse generation control apparatus has a disadvantage in that it is impossible to accurately correct the head switching signal since an error of the head switching signal resulting from a positioning error of the pulse generating head in the drum is corrected by adjusting the variable resistor. This results in an inaccurate correction of the error in the phase of the drum.

SUMMARY OF THE INVENTION

Therefore, the present invention has been made in view of the above problem, and it is an object of the present invention to provide an apparatus and a method for automatically controlling pulse generation, in which an error of a head switching signal resulting from a positioning error of a pulse generating head in a drum is accurately corrected.

In accordance with an aspect of the present invention, there is provided an apparatus for automatically controlling pulse generation, comprising: a drum having video heads, a pulse generating head and a frequency generating head, said video heads playing back video signals recorded on a magnetic tape, said pulse and frequency generating heads generating a pulse generation signal and a frequency generation signal, respectively, to accurately play back the recorded video signals; first and second wave-shaping means for wave-shaping the pulse generation signal from said pulse generating head and the frequency generation signal from said frequency generating head, respectively; mono-multi signal generating means for generating a mono-multi signal having a rising curve time; servo means for inputting the wave-shaped pulse generation signal and frequency generation signal from said first and second wave-shaping means and the mono-multi signal from said mono-multi signal generating means, for outputting a head switching signal in response to the inputted mono-multi signal, and for outputting a drum control signal in response to the inputted pulse generation signal and frequency generation signal and the head switching signal, to control the speed and phase of said drum; pre-amplifying means for amplifying the video signals played back by said video heads; luminance/chrominance processing means for selecting a channel for inputting one of the video signals from said pre-amplifying means in response to the head switching signal from said servo means, processing luminance and chrominance of the video signal inputted from the selected channel and outputting the processed video signal; and automatic mono-multi signal control means for separating a vertical synchronous signal from the video signal from said luminance/chrominance processing means, and for, varying the rising curve time of the mono-multi signal from said mono-multi signal generating means in accordance with a time interval between the separated vertical synchronous signal and the head switching signal from said servo means for thereby correcting an error of the head switching signal based on the rising curve time of the mono-multi signal.

In accordance with another aspect of the present invention, there is provided a method of automatically controlling pulse generation, comprising the steps of: (a) determining whether a play mode is performed, when a cassette tape is inserted, and performing a counting operation for a predetermined period of time to stabilize a system, if it is determined that the play mode is performed; (b) stopping the counting operation upon completion of the counting operation for the predetermined period of time and outputting a pulse width modulation signal; (c) determining whether a head switching signal rises from its low state to its high state and again performing the counting operation if it is determined that the head switching signal rises from its low state to its high state; (d) determining whether a vertical synchronous signal rises from its low state to its high state, stopping the counting operation if it is determined that the vertical synchronous signal rises from its low state to its high state, outputting a count at that time and determining whether the outputted count is within the range of a predetermined value; and (e) maintaining the existing pulse width modulation signal to maintain the existing head switching signal, if it is determined that the outputted count is within the range of the predetermined value, and varying a pulse width of the existing pulse width modulation signal to correct an error of the existing head switching signal, if it is determined that the outputted count is beyond the range of the predetermined value.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram of a conventional apparatus for controlling pulse generation;

FIGS. 2A to 2E are timing diagrams of signals from components in the apparatus in FIG. 1;

DETAILED DESCRIPTION OF THE PREFERRED EMBODIMENTS

Figure 3:
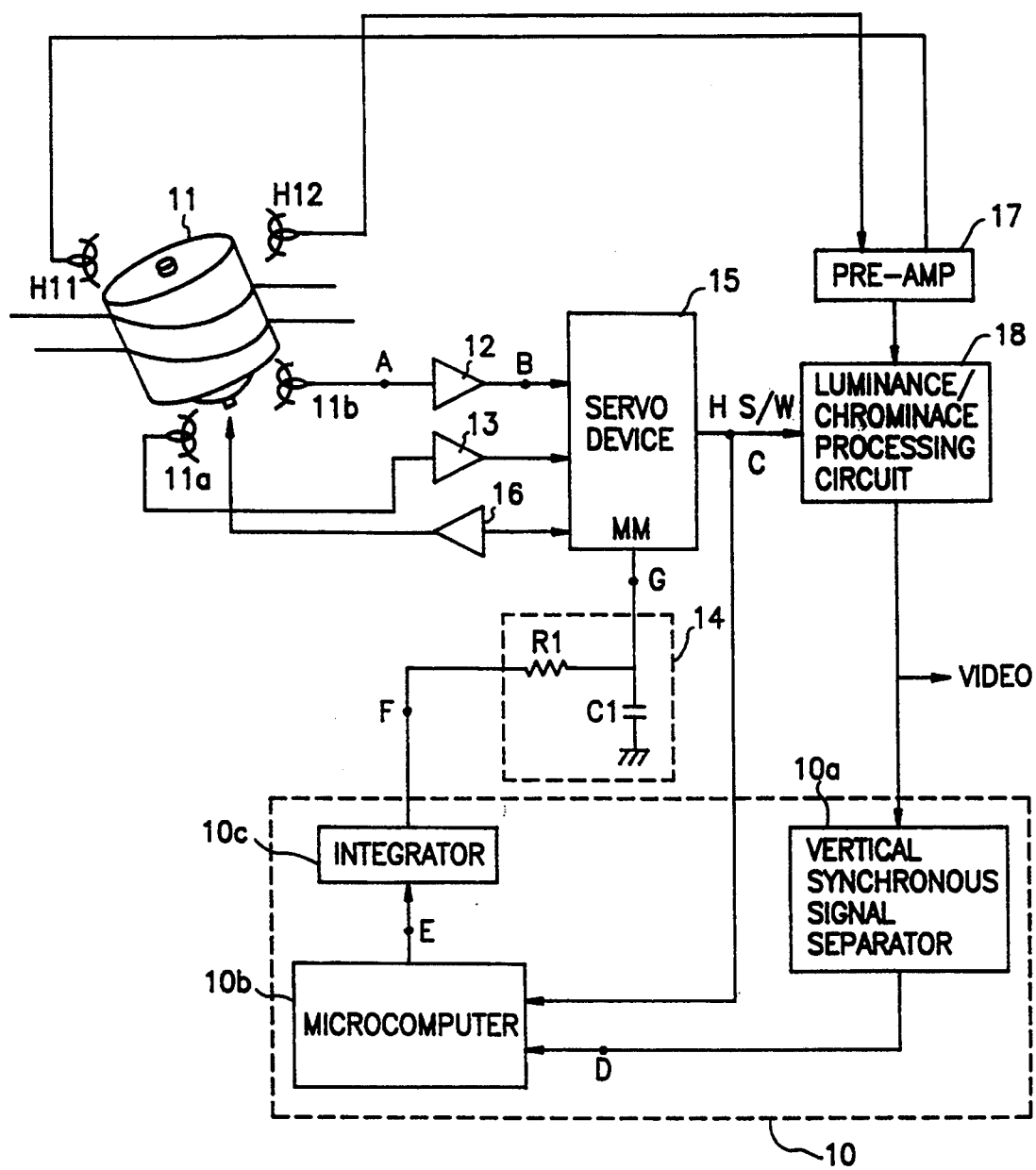
FIG. 3 is a block diagram of an apparatus for automatically controlling pulse generation in accordance with an embodiment of the present invention.

Referring to FIG. 3, there is shown an apparatus for automatically controlling pulse generation in accordance with an embodiment of the present invention. As shown in this drawing, the automatic pulse generation control apparatus of the present invention comprises a drum 11 with video heads H11 and H12, a pulse generating head 11a and a frequency generating head 11b. The video heads H11 and H12 are adapted to play back video signals recorded on a magnetic tape. The pulse and frequency generating heads 11a and 11b are adapted to generate a pulse generation signal PG and a frequency generation signal FG, respectively, to accurately play back the recorded video signals.

Wave-shapers 12 and 13 are connected respectively to the pulse generating head 11a and the frequency generating head 11b to wave-shape the pulse generation signal PG from the pulse generating head 11a and the frequency generation signal FG from the frequency generating head 11b, respectively.

A servo device 15 is connected to outputs of the wave-shapers 12 and 13 to input the wave-shaped pulse generation signal and frequency generation signal from the wave-shapers 12 and 13 and a mono-multi signal MM from a mono-multi signal generating circuit 14, to output a head switching signal H S/W in response to the inputted mono-multi signal and to output through an amplifier 16 a drum control signal in response to the inputted pulse generation signal and frequency generation signal and the head switching signal H S/W to control the speed and phase of the drum 11.

A pre-amplifying circuit 17 is connected to the video heads H11 and H12 to amplify the video signals played back by the video heads H11 and H12.

A luminance/chrominance processing circuit 18 is connected to an output of the pre-amplifying circuit 17 to select a channel for inputting one of the video signals from the pre-amplifying circuit 17 in response to the head switching signal H S/W from the servo device 15, to process luminance and chrominance of the video signal inputted from the selected channel and to output the processed video signal.

The automatic pulse generation control apparatus of the present invention also comprises an automatic mono-multi signal control circuit 10 for separating a vertical synchronous signal from the video signal from the luminance/chrominance processing circuit 18, and for varying a rising curve time t of the mono-multi signal MM from the mono-multi signal generating circuit 14 in response to the separated vertical synchronous signal and the head switching signal H S/W from the servo device 15, thereby correcting an error of the head switching signal H S/W based on the rising curve time t of the mono-multi signal MM.

The mono-multi signal generating circuit 14 is provided with a resistor R1 and a condenser C1.

The automatic mono-multi signal control circuit 10 includes a vertical synchronous signal separator 10a for separating the vertical synchronous signal Vs from the video signal from the luminance/chrominance processing circuit 18, a microcomputer 10b for generating a pulse width modulation (PWM) signal to count an interval between a rising edge of the head switching signal H S/W and the next subsequent edge of the vertical synchronous signal Vs of the vertical synchronous signal separator 10a, and an integrator 10c for integrating the PWM signal from the microcomputer 10b and outputting the integrated signal to the mono-multi signal generating circuit 14 to vary the rising curve time t of the mono-multi signal MM.

Figure 4:
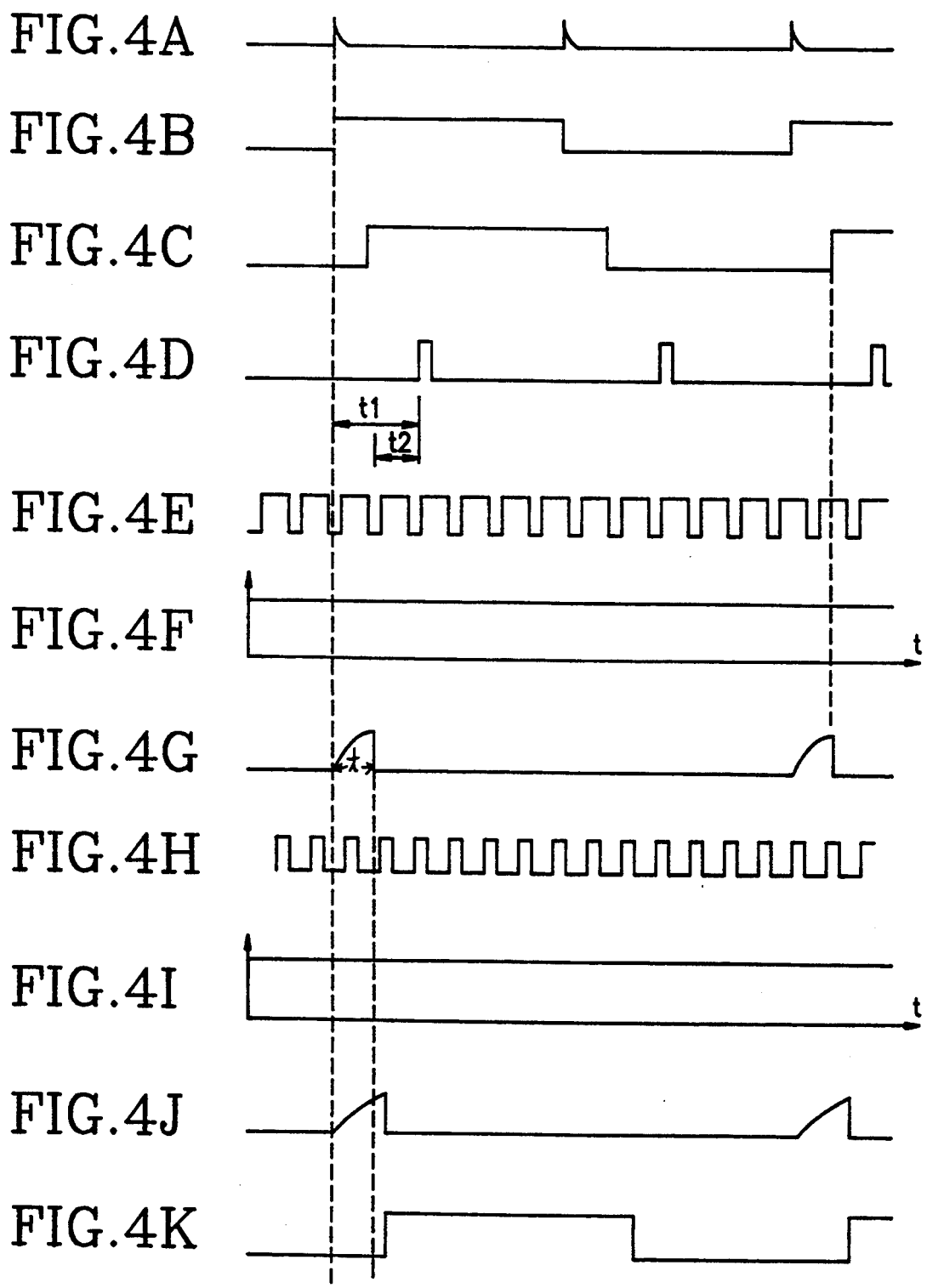
FIGS. 4A to 4K are timing diagrams of signals from components in the apparatus in FIG. 3.
Figure 5:
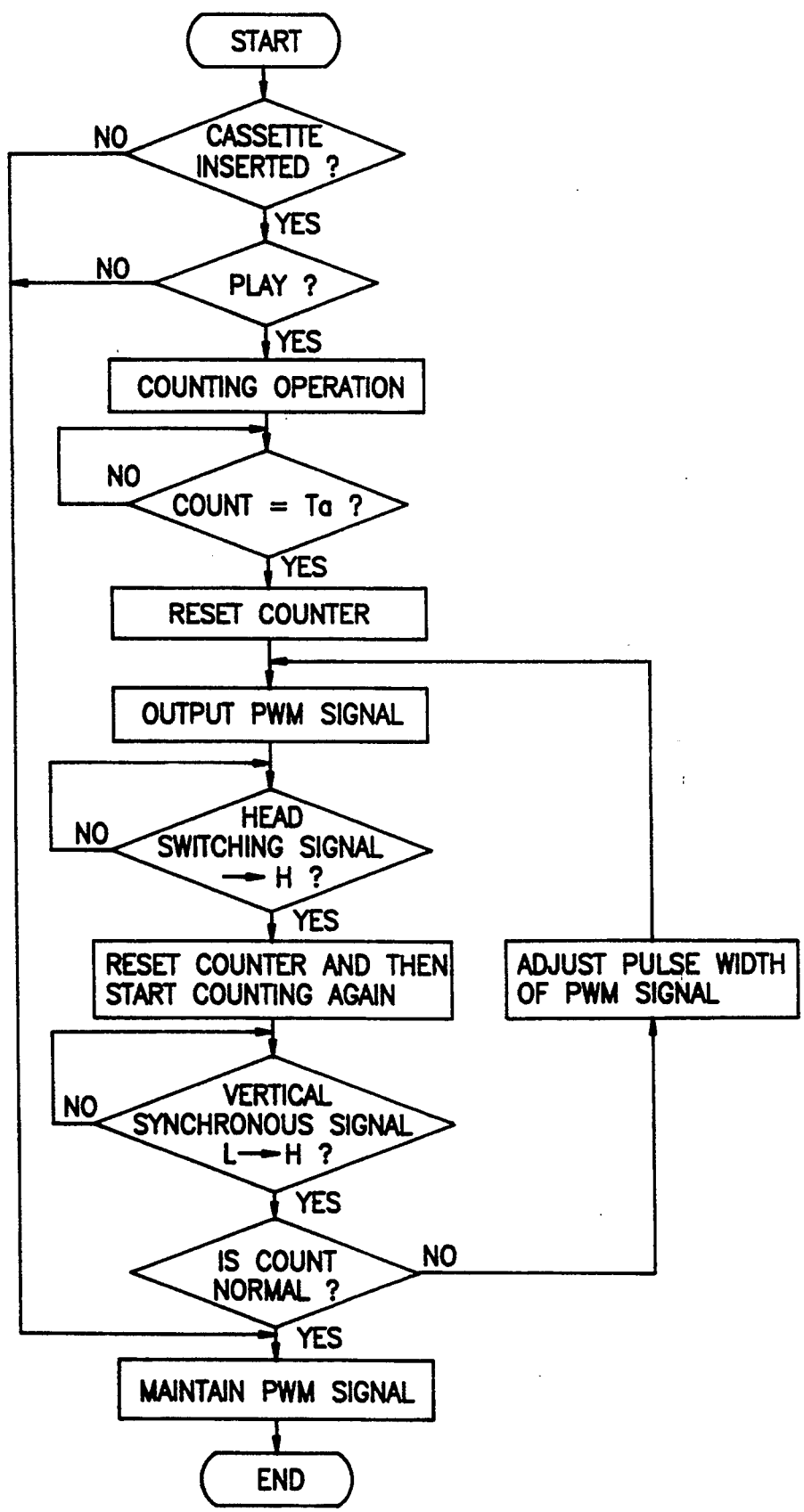
FIG. 5 is a flowchart illustrating a method of automatically controlling pulse generation in accordance with an embodiment of the present invention.

The operation of the automatic pulse generation control apparatus with the above-mentioned construction in accordance with the embodiment of the present invention will hereinafter be described in detail with reference to FIGS. 3 to 5.

As the drum 11 is rotated, the video signals recorded on the magnetic tape are played back by the video heads H11 and H12, amplified by the pro-amplifying circuit 17 and then applied to the luminance/chrominance processing circuit 18.

Also, the pulse generation signal PG and the frequency generation signal FG are outputted from the pulse generating head 11a and the frequency generating head 11b, respectively, and then wave-shaped by the wave-shapers 12 and 13, respectively. The wave-shaped pulse generation signal PG and frequency generation signal FG are applied to the servo device 15. As a result, the servo device 15 generates the drum control signal in response to the pulse generation signal PG, the frequency generation signal FG and the head switching signal H S/W to control the speed and phase of the drum 11. The drum control signal from the servo device 15 is amplified by the amplifier 16 and then applied to the drum 11, thereby causing the speed and phase of the drum 11 to be controlled.

In detail, the pulse generation signal PG is outputted, as shown in FIG. 4A, from the pulse generating head 11a in the drum 11 and then wave-shaped as shown in FIG. 4B by the wave-shaper 12. The pulse generation signal PG wave-shaped as shown in FIG. 4B is outputted from the wave-shaper 12 to the servo device 15, which outputs the head switching signal H S/W as shown in FIG. 4C according to the inputted pulse generation signal PG, so as to control the phase of the drum 11.

The head switching signal H S/W from the servo device 15 is also applied to the luminance/chrominance processing circuit 18. The luminance/chrominance processing circuit 18 serves to select a channel for inputting one of the video signals from the pre-amplifying circuit 17 in response to the head switching signal H S/W from the servo device 15. Also, the luminance/chrominance processing circuit 18 processes the luminance and chrominance of the video signal inputted from the selected channel and outputs the processed video signal to the automatic mono-multi signal control circuit 10.

In the automatic mono-multi signal control circuit 10, the vertical synchronous signal separator 10a separates the vertical synchronous signal Vs as shown in FIG. 4D from the video signal from the luminance/chrominance processing circuit 18 and applies the separated vertical synchronous signal Vs to the microcomputer 10b, which is also applied with the head switching signal H S/W from the servo device 15.

Now, the operation of the microcomputer 10b will be described in detail with reference to FIG. 5.

First, when the magnetic tape such as a cassette video tape is inserted and a play (or playback) mode is performed, a counter is operated to stabilize the system. Upon completion of the operation of the counter, the microcomputer 10b outputs the pulse width modulation (PWM) signal as shown in FIG. 4E to the integrator 10c.

The PWM signal from the microcomputer 10b as shown in FIG. 4E is integrated as shown in FIG. 4F by the integrator 10c and then applied to the mono-multi signal generating circuit 14, which generates the mono-multi signal MM as shown in FIG. 4G having its rising curve time determined according to the output of the integrator 10c and applies it to the servo device 15.

The servo device 15 outputs the head switching signal H S/W as shown in FIG. 4C in response to the mono-multi signal MM from the mono-multi signal generating circuit 14. As shown in FIGS. 4C and 4G, the head switching signal H S/W rises from its low state to its high state at the moment that the mono-multi signal MM falls from its high state to its low state. The microcomputer 10b resets and then starts the counter again, at the moment that the head switching signal H S/W rises from its low state to its high state.

The counting operation continues to be performed with respect to the PWM signal, until the vertical synchronous signal Vs, as shown in FIG. 4D, outputted from the vertical synchronous signal separator 10a rises from its low state to its high state. At this time, if a count of the counter is within the range of a predetermined value (6.5 H or 416 μs), the microcomputer 10b determines that the count of the counter is normal, and then maintains the existing PWM signal pulse width. On the other hand, if the count of the counter is beyond the range of the predetermined value, the microcomputer 10b adjusts the pulse width of the PWM signal as shown in FIG. 4H and then outputs the PWM signal having the adjusted pulse width to the integrator 10c.

The PWM signal from the microcomputer 10b as shown in FIG. 4H is integrated as shown in FIG. 4I by the integrator 10c and then applied to the mono-multi signal generating circuit 14, which generates the mono-multi signal MM as shown in FIG. 4J having its rising curve time determined according to the output of the integrator 10c.

The slope of the rising curve of the mono-multi signal MM and thus the rising curve time is determined according to the time constant of the resistor R1 and the condenser C1 and the voltage level of the output signal from the integrator 10c. The rising curve slope S of the mono-multi signal MM can be expressed by the following equation:

$$S = (1 - e^{-(1/RC)t}) \times Vin$$

As shown in FIG. 4K, the head switching signal H S/W rises from its low state to its high state at the moment that the mono-multi signal MM as shown in FIG. 4J falls from its high state to its low state. The head switching signal H S/W as shown in FIG. 4K is applied from the servo device 15 to the microcomputer 10b.

The microcomputer 10b resets and then starts the counter again, at the moment that the head switching signal H S/W rises from its low state to its high state.

The counting operation continues to be performed with respect to the PWM signal until the vertical synchronous signal Vs, as shown in FIG. 4D, outputted from the vertical synchronous signal separator 10a rises from its low state to its high state. At this time, if the count of the counter is within the range of the predetermined value (6.5 H or 416 μs), the microcomputer 10b determines that the count of the counter is normal, and then maintains the existing PWM signal pulse width output to the integrator 10c. On the other hand, if the count of the counter is beyond the range of the predetermined value, the microcomputer 10b adjusts the pulse width of the PWM signal and then outputs the PWM signal having the adjusted pulse width to the integrator 10c.

As mentioned above, in accordance with the embodiment of the present invention, the rising curve time of the mono-multi signal is automatically adjusted by adjusting the pulse width of the PWM signal from the microcomputer, thereby enabling correction of the error of the head switching signal resulting from the positioning error of the pulse generating head in the drum.

Figure 6:
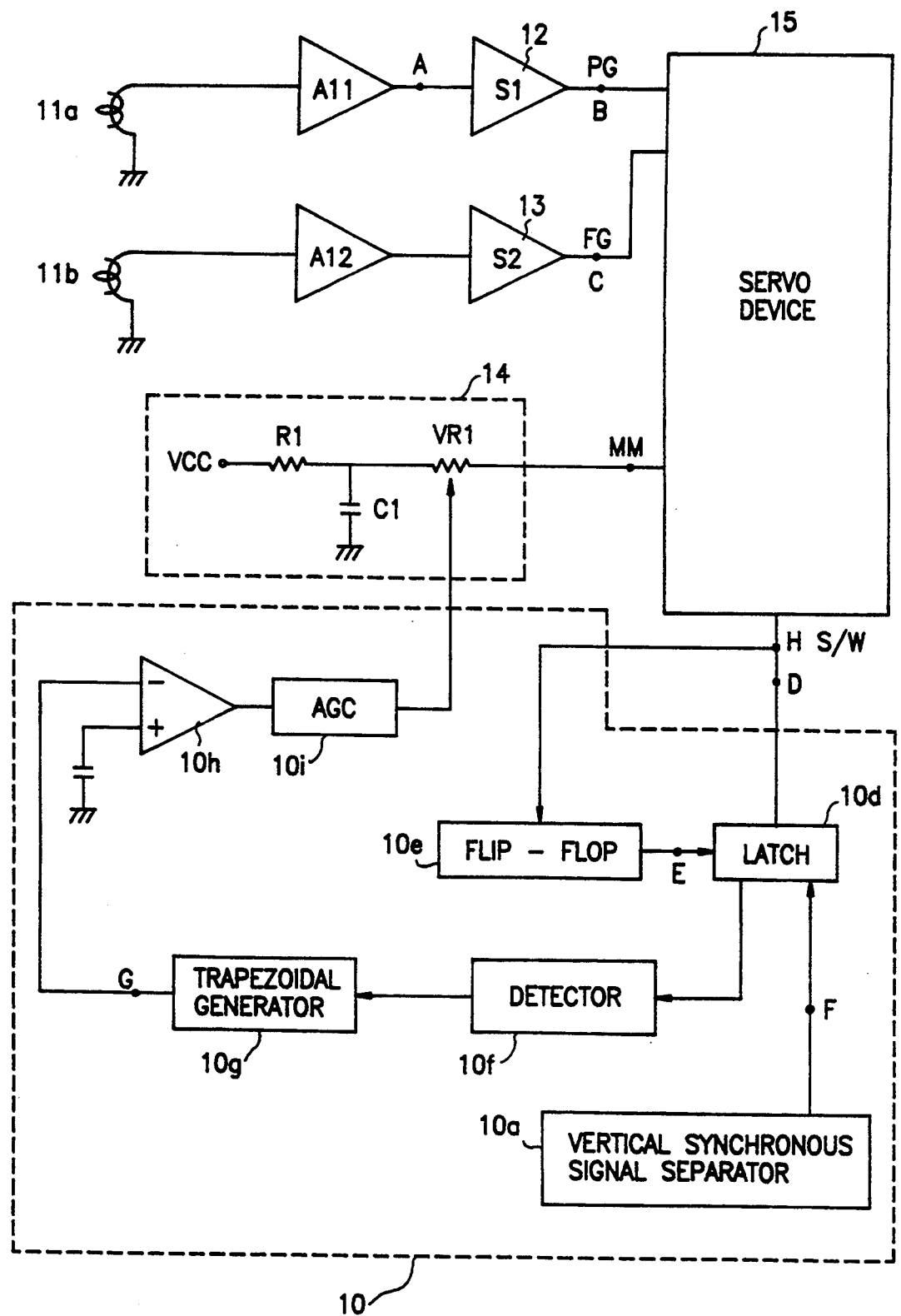
FIG. 6 is a block diagram of an apparatus for automatically controlling pulse generation in accordance with an alternative embodiment of the present invention.

Referring to FIG. 6, there is shown a block diagram of an apparatus for automatically controlling pulse generation in accordance with an alternative embodiment of the present invention. The construction of this embodiment is substantially the same as that of FIG. 3, with the exception that the construction of the automatic mono-multi signal control circuit 10 is different from that of FIG. 3.

Namely, the pulse and frequency generating heads 11a and 11b are adapted to generate the pulse generation signal PG and the frequency generation signal FG, respectively, to accurately play back the recorded video signals. Amplifiers A1 and A2 are also provided to amplify the pulse generation signal PG from the pulse generating head 11a and the frequency generation signal FG from the frequency generating head 11b, respectively. The wave-shapers 12 and 13 are adapted to wave-shape the amplified pulse generation signal PG and frequency generation signal FG from the amplifiers A1 and A2, respectively. The servo device 15 is adapted to input the wave-shaped pulse generation signal and frequency generation signal from the wave-shapers 12 and 13 and the mono-multi signal MM from the mono-multi signal generating circuit 14, to output the head switching signal H S/W in response to the inputted mono-multi signal and to output the drum control signal in response to the inputted pulse generation signal and frequency generation signal and the head switching signal H S/W, to control the speed and phase of the drum.

The mono-multi signal generating circuit 14 is provided with a variable resistor VR1, in addition to the resistor R1 and the condenser C1. The rising curve time t of the mono-multi signal MM from the mono-multi signal generating circuit 14 is varied according to a time constant of the resistor R1, the condenser C1 and the variable resistor VR1.

The automatic mono-multi signal control circuit 10 is adapted to vary the rising curve time t of the mono-multi signal MM by adjusting the variable resistor VR1 in the mono-multi signal generating circuit 14. The automatic mono-multi signal control circuit 10 includes the vertical synchronous signal separator 10a for separating the vertical synchronous signal Vs from the video signal from the luminance/chrominance processing circuit 18, a latch 10d for inputting the head switching signal H S/W from the servo device 15 and the vertical synchronous signal Vs from the vertical synchronous signal separator 10a and delaying the output of the head switching signal H S/W from a rising edge of the head switching signal H S/W to a falling edge of the vertical synchronous signal Vs, and a flip-flop 10e for outputting a predetermined period (416 μs) of pulse to the latch 10d at a falling edge of the head switching signal H S/W.

Also, the automatic mono-multi signal control circuit 10 includes a detector 10f for detecting a rising edge of the vertical synchronous signal Vs latched in the latch 10d and the rising edge of the head switching signal H S/W flip-flopped by the pulse from the flip-flop 10e and detecting a value of the frequency generation signal which is counted from the detected rising edge of the vertical synchronous signal Vs to a falling edge of the pulse of the flip-flop 10e, a trapezoidal generator 10g for converting an output signal from the detector 10f into a desired voltage, a comparator 10h for comparing an output voltage from the trapezoidal generator 10g with a reference voltage, and an automatic gain controller (AGC) 10i for performing an automatic gain control operation in response to an output signal from the comparator 10g to vary the rising curve time t of the mono-multi signal MM.

The operation of the automatic pulse generation control apparatus with the above-mentioned construction in accordance with the second embodiment of the present invention will hereinafter be described in detail with reference to FIGS. 6 and 7A through 7H.

Figure 7A:
FIGS. 7A to 7H are timing diagrams of signals from components in the apparatus in FIG. 6.
Figure 7B:
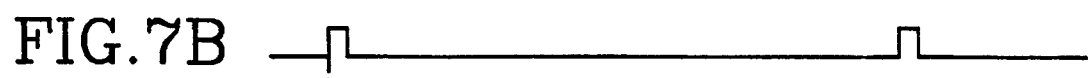
Figure 7C:

The pulse generation signal PG is generated from the pulse generating head 11a, amplified by the amplifier A1 and wave-shaped by the wave-shaper 12. In detail, the pulse generation signal PG is generated as shown in FIG. 7A from the pulse generating head 11a and then amplified and wave-shaped as shown in FIG. 7B by the amplifier A1 and the wave-shaper 12. Also, the frequency generation signal FG is generated from the frequency generating head 11b and then amplified and wave-shaped as shown in FIG. 7C by the amplifier A2 and the wave-shaper 13.

The wave-shaped pulse generation signal PG and frequency generation signal FG from the wave-shapers 12 and 13 are applied to the servo device 15, which is also applied with the mono-multi signal MM from the mono-multi signal generating circuit 14. The servo device 15 outputs the head switching signal H S/W in response to the mono-multi signal MM from the mono-multi signal generating circuit 14.

The head switching signal H S/W from the servo device 15 is applied to the latch 10d and the flip-flop 10e in the automatic mono-multi signal control circuit 10. The flip-flop 10e outputs the predetermined period (416 $\mu$s) T1 of pulse to the latch 10d at the falling edge of the head switching signal H S/W.

Also, the vertical synchronous signal Vs from the vertical synchronous signal separator 10a is applied to the latch 10d and the rising edge thereof is then detected by the detector 10f.

Figure 7D:
Figure 7E:
Figure 7F:

As the head switching signal H S/W is delayed by a predetermined period of time T3 as shown in FIG. 7D, the output pulse from the flip-flop 10e is delayed by the predetermined period of time T3 as shown in FIG. 7E.

Figure 7G:

Then, the detector 10f detects the rising edge of the vertical synchronous signal Vs latched in the latch 10d and the rising edge of the head switching signal H S/W flip-flopped by the pulse from the flip-flop 10e and detects a value of the frequency generation signal which is counted from the detected rising edge of the vertical synchronous signal Vs to the falling edge of the pulse of the flip-flop 10e. The detected value from the detector 10f is applied to the trapezoidal generator 10g, which then outputs the desired voltage as shown in FIG. 7G. The output voltage from the trapezoidal generator 10g is compared with the reference voltage by comparator 10h, which outputs the voltage difference to the automatic gain controller 10i.

Figure 7H:

The automatic gain controller 10i serves to vary a value of the variable resistor VR1 in the mono-multi signal generating circuit 14 in accordance with the voltage difference from the comparator 10h. In the mono-multi signal generating circuit 14, the rising curve time t of the mono-multi signal MM is varied based on the value of the variable resistor VR1 which is varied by the automatic gain controller 10i. As a result, the servo device 15 outputs the head switching signal H S/W as shown in FIG. 7H in response to the mono-multi signal MM of the varied rising curve time t. Namely, the head switching signal H S/W as shown in FIG. 7D is corrected as shown in FIG. 7H.

As hereinbefore described, according to the present invention, the error of the head switching signal resulting from the positioning error of the pulse generating head in the drum is accurately corrected, resulting in the accurate correction of the error in the phase of the drum.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An apparatus for automatically controlling the generation of a head switching signal in a videotape playback device, comprising:

a drum having video heads, a pulse generating head and a frequency generating head, said video heads playing back video signals recorded on a magnetic tape, said pulse and frequency generating heads generating a pulse generation signal and a frequency generation signal, respectively, to accurately play back the recorded video signals;

first and second wave-shaping means for wave-shaping the pulse generation signal from said pulse generating head and the frequency generation signal from said frequency generating head, respectively;

mono-multi signal generating means for generating a mono-multi signal having a rising curve time;

servo means for inputting the wave-shaped pulse generation signal and frequency generation signal from said first and second wave-shaping means and the mono-multi signal from said mono-multi signal generating means, for outputting a head switching signal in accordance with the rising curve time of the inputted mono-multi signal, and for outputting a drum control signal in response to the inputted pulse generation signal and frequency generation signal and the head switching signal, to control the speed and phase of said drum;

pre-amplifying means for amplifying the video signals played back by said video heads;

luminance/chrominance processing means for selecting a channel for inputting one of the video signals from said pre-amplifying means in response to the head switching signal from said servo means, processing luminance and chrominance of the video signal inputted from the selected channel and outputting the processed video signal; and automatic mono-multi signal control means for separating a vertical synchronous signal from the video signal from said luminance/chrominance processing means, and for varying the rising curve time of the mono-multi signal from said mono-multi signal generating means in accordance with a time interval between the separated vertical synchronous signal and the head switching signal from said servo means for thereby correcting an error of the head switching signal based on the rising curve time of the mono-multi signal.

2. An apparatus as set forth in claim 1, wherein said automatic mono-multi signal control means comprises:

a vertical synchronous signal separator means for separating the vertical synchronous signal from the video signal from said luminance/chrominance processing means;

a microcomputer means for generating a pulse width modulation signal having a pulse width determined in accordance with an interval between a rising edge of the vertical synchronous signal from said vertical synchronous signal separator means and a rising edge of the head switching signal from said servo means; and an integrator means for integrating the pulse width modulation signal from said microcomputer means and for outputting the integrated signal to said mono-multi signal generating means to control the rising curve time of the mono-multi signal.

3. An apparatus as set forth in claim 1, wherein said automatic mono-multi signal control means comprises:

a vertical synchronous signal separator means for separating the vertical synchronous signal from the video signal from said luminance/chrominance processing means;

a latch means for inputting the head switching signal from said servo means and the vertical synchronous signal from said vertical synchronous signal separator means and delaying the output of the head switching signal from a rising edge of the head switching signal to a falling edge of the vertical synchronous signal;

a flip-flop means for outputting a predetermined period of pulse to said latch means at a falling edge of the head switching signal;

a detector means for detecting a rising edge of the vertical synchronous signal latched in said latch means and the rising edge of the head switching signal flip-flopped by the pulse from said flip-flop means, detecting a value of the frequency generation signal counted from the detected rising edge of the vertical synchronous signal to a falling edge of the pulse outputted by said flip-flop means and outputting said detected value as a signal;

a trapezoidal generator means for converting the output signal from said detector means into a corresponding output voltage;

a comparator means for comparing the output voltage from said trapezoidal generator means with a reference voltage and outputting a signal in accordance with a voltage difference therebetween; and an automatic gain controller means for performing an automatic gain control operation of said mono-multi signal generating means in response to the output signal from said comparator means to vary the rising curve time of the mono-multi signal in accordance therewith.

* * * * *